May 5, 1942.　　　　P. M. FREER　　　　2,281,932
FRICTION COUPLING
Filed Aug. 2, 1940　　　　3 Sheets-Sheet 1

INVENTOR.
Phelps M. Freer
BY
Whittemore Hulbert & Belknap
Attys.

May 5, 1942.　　　　P. M. FREER　　　　2,281,932
FRICTION COUPLING
Filed Aug. 2, 1940　　　　3 Sheets-Sheet 2

INVENTOR.
Phelps M. Freer
BY Whittemore Hulbert & Belknap
Attys.

May 5, 1942.  P. M. FREER  2,281,932
FRICTION COUPLING
Filed Aug. 2, 1940  3 Sheets-Sheet 3

INVENTOR.
Phelps M. Freer
BY Wetmore Hulbert & Belknap
Attys.

Patented May 5, 1942

2,281,932

UNITED STATES PATENT OFFICE 2,281,932

FRICTION COUPLING

Phelps M. Freer, Detroit, Mich.

Application August 2, 1940, Serial No. 349,885

11 Claims. (Cl. 188—152)

The invention relates to friction couplings and refers more particularly to friction brakes especially applicable to motor vehicles.

The invention has for some of its objects to provide an improved actuator for applying the brake; to provide both mechanical means and fluid pressure operated means arranged to produce a favorable brake applying effort; to provide the fluid pressure operated means with adjustable means for limiting the relative disengaging movement of the brake elements which are frictionally engageable with each other; to mount the mechanical brake actuator on the fluid pressure operated means; and to provide an adjustable stop for limiting the return movement of the mechanical brake actuator and to thereby limit the relative disengaging movement of the brake elements.

With these and other objects in view, the invention resides in the novel features of construction and combinations and arrangements of parts, as more fully hereinafter set forth.

In the drawings—

Figure 1:
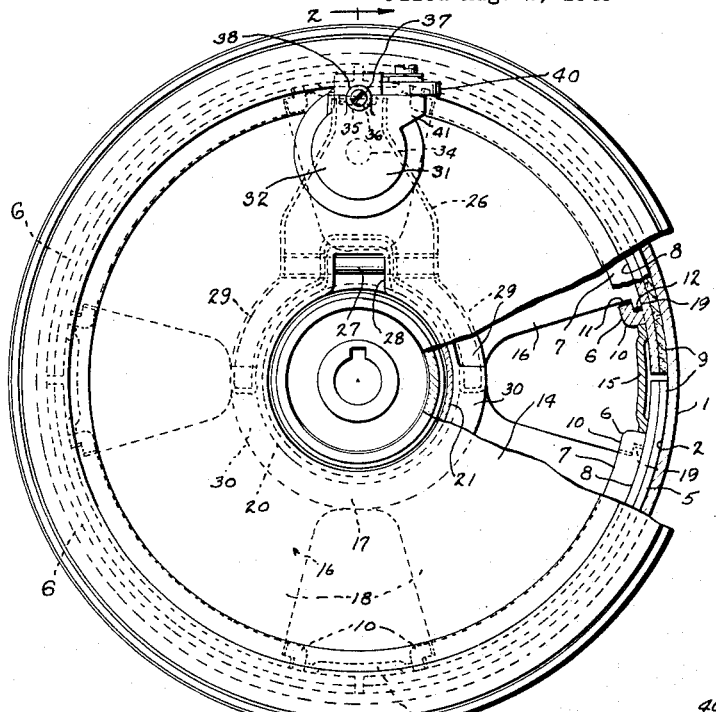
Figure 1 is an elevation, partly broken away, of a friction brake embodying my invention.
Figures 2, 3, 4:
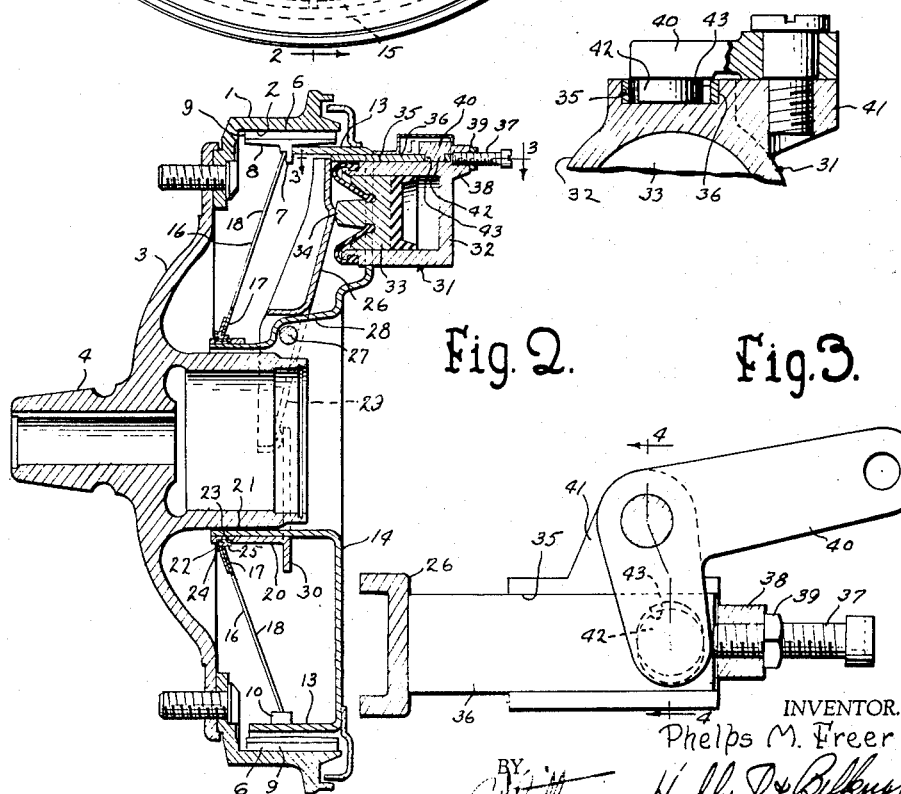
Figure 2 is a cross section on the line 2—2 of Figure 1.
Figure 3 is a cross section on the line 3—3 of Figure 2.
Figure 4 is a cross section on the line 4—4 of Figure 3.

The friction coupling illustrated in the present instance is a friction brake designed particularly for use in motor vehicles. The rotatable element of the brake illustrated in Figures 1, 2, 3 and 4 comprises the brake drum 1 having the internal friction face 2. The brake drum, as shown, is mounted upon the fixed flange 3 of the hub 4, the fixed flange being provided with suitable means for securing a vehicle wheel thereto. The non-rotatable element of the brake comprises the friction member 5 which is formed of the series of generally T-section brake shoes 6 each having a body formed with the web 7 and the axial flange 8. The body is formed in one piece and is longitudinally arcuate with a radius of curvature such that when the lining 9 which is secured to the axial flange is applied it will contact throughout its extent with the internal friction face of the brake drum. The web 7 has near its ends the axial portions 10 which are provided with the projections 11 extending peripherally toward the middle of the body and radially spaced from the axial flange 8 to provide recesses 12 opening peripherally toward the middle of the body. The side of the web opposite the axial portions slidably engages the annular axially extending flange 13 at the periphery of the backing plate 14. The ends of the axial portions 10 opposite the projections 11 are slidably engageable with the side edges of the tongues 15 which extend axially from the annular flange 13 and are preferably integral therewith. The construction is such that the shoes are guided by the backing plate and its tongues, and the latter serve as abutments for limiting the peripheral movement of the shoes.

For radially moving the shoes into engagement with the internal friction face of the brake drum and also out of engagement therewith, the resilient dished disc 16 is provided. This disc is formed of spring material and it is dished rearwardly and toward the webs 7 of the shoes and retains the webs against the edge of the peripheral axial flange 13 of the backing plate. The disc has the hub 17 and the spokes 18 radiating from the hub, there being preferably one spoke for each shoe. Each spoke has at the outer end of each of its side edges the peripheral projection 19 which has a radial dimension to closely fit in the adjacent recess 12 of the associated shoe. The construction is such that each spoke is connected to its shoe to positively move the same radially toward and away from the internal friction face of the brake drum without any lost motion and at the same time each spoke provides for peripheral movement of its associated shoe so that each spoke is free from torsion, except that resulting from friction between the associated shoe and the spoke when the shoe moves peripherally relative to the spoke.

The disc is adapted to be flattened to thereby move the shoes radially outwardly by reciprocable means operatively connected to the hub of the disc. In detail, 20 is a sleeve encircling and engaging the central forwardly turned flange 21 of the backing plate 14. The front end of the sleeve is formed with the annular groove 22 in which is located the transversely split resilient mounting collar 23 which is formed with the radial flange 24 and the axial flange 25. The radial flange abuts the front face of the hub 17 of the disc and the axial flange is formed with peripherally extending resilient tongues which abut the inner edge of the hub of the disc.

For moving the sleeve axially rearwardly to thereby flatten the disc, I have provided the lever 26 which is pivotally mounted intermediate its ends upon the shaft 27 which extends through the depression 28 in the backing plate 14. The lever is formed with the furcations 29 at its lower end for engaging the front face of the substantially semi-circular radial flange 30 formed upon the rear end of the sleeve 20.

The upper end of the lever 26 is adapted to be moved forwardly, both by fluid pressure operated means and mechanical means. As shown, 31 is a wheel cylinder comprising the cylinder 32 and the piston 33 slidable within the cylinder. The cylinder is mounted upon the backing plate and the piston is engageable with the rounded portion 34 formed upon the lever 26. The upper side of the cylinder is formed with the axial slot 35 in which is located the longitudinally reciprocable actuator rod 36, the front end of the rod being engageable with the upper end of the lever 26. The rear end of the rod is engageable with the end of the screw 37 threaded into the boss 38 upon the cylinder 32. The screw 37 is adjustable and adapted to be locked in adjusted position by the locknut 39, the arrangement being such that the rearward movement of the upper end of the lever 26 is adjustably limited to thereby adjustably limit the return of the disc toward its natural dished state by reason of its inherent resiliency. Thus, the screw serves as an adjustable stop to limit the disengaging movement of the shoes from the internal friction face of the brake drum. The rod 36 is adapted to be moved forwardly by means of the bell crank 40 which is pivotally mounted upon the lateral projection 41 formed upon the cylinder 32 and having one arm provided with the downwardly extending pin 42 engageable in the transverse elongated opening 43 formed in the rod. The other arm of the bell crank is adapted to be operatively connected to suitable operating linkage.

Figure 5:
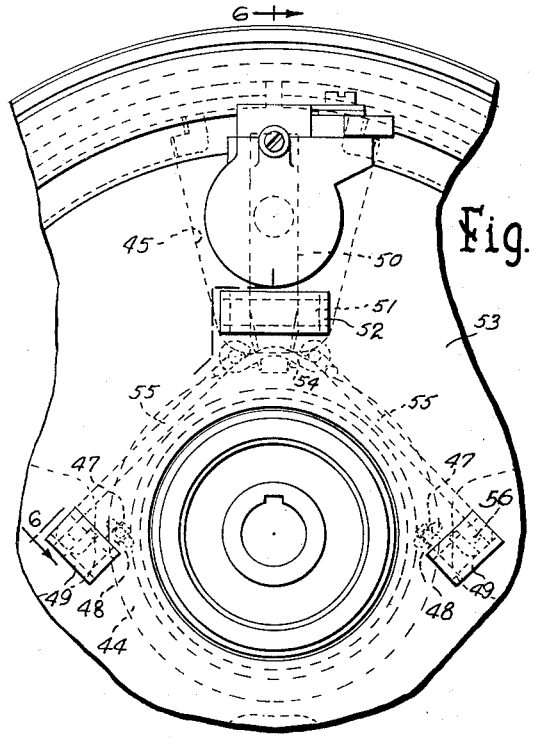
Figures 5 and 6 are views similar to Figures 1 and 2, respectively, showing a modification.
Figure 6:
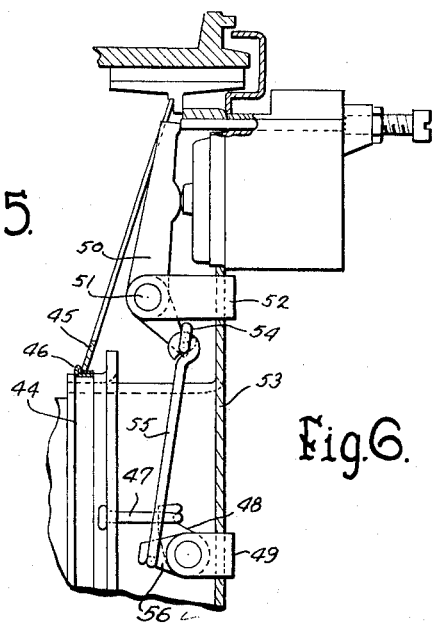
Figure 7:
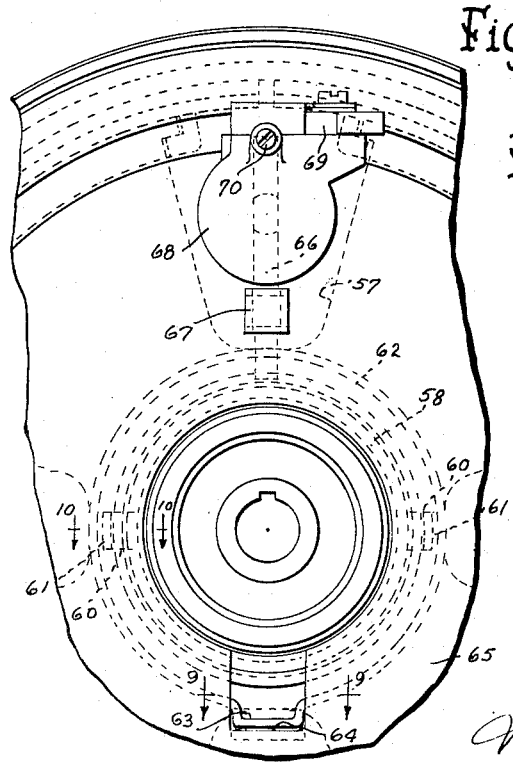
Figures 7 and 8 are views similar to Figures 1 and 2, respectively, showing another modification.
Figures 8, 9, 10:
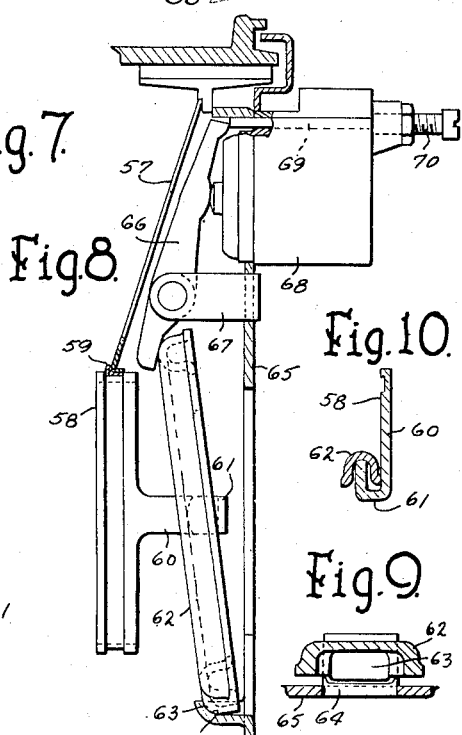
Figure 9 is a cross section on the line 9—9 of Figure 7.
Figure 10 is a cross section on the line 10—10 of Figure 7.

Figures 5 and 6 disclose another modification in which the relatively rotatable elements of the brake are the same as illustrated in Figures 1 to 4, inclusive. As shown in Figures 5 and 6, 44 is the axially reciprocable sleeve carrying the resilient dished disc 45 through the transversely split resilient mounting collar 46, which latter is mounted in an annular groove formed in the sleeve. The sleeve is adapted to be moved axially rearwardly by means comprising the diametrically opposite pull rods 47 having heads at their front ends abutting the front face of the annular flange formed at the rear end of the sleeve and having eyes at their rear ends encircling the free upper ends of the levers 48 which are pivotally mounted upon the brackets 49. 50 is a bell crank lever extending radially and located vertically above the axis of the brake, the upper end portion of the upper arm being adapted to extend through the space between adjacent spokes of the disc 45. The lever is pivotally mounted at 51 upon the bracket 52. The brackets 49 and 52 are U-shaped and have the sides of their U's extending through the backing plate 53 and the bases of their U's at the rear side of and fixedly secured to the backing plate as by being welded thereto. The lower arm of the bell crank lever 50 is operatively connected to the levers 48 by means of the evener bar 54 which extends over the free end of the lower arm and has its ends connected to the pull rods 55 which are connected to the levers 56 fixedly secured to the levers 48. The brackets 49 are mounted on the backing plate 53 so that the pivots for the levers 48 and 56 have their axes preferably at right angles to the longitudinal axes of the pull rods 55.

The bell crank lever 50 is adapted to be actuated by the same construction of fluid pressure operated actuator and mechanical actuator as illustrated in Figures 1 to 4, inclusive. This construction also includes the adjustable stop for limiting the return movement of the disc under its inherent resiliency upon removal of the brake applying pressure.

The modification illustrated in Figures 7, 8, 9 and 10 employs the same construction of relatively movable elements of the brake, as illustrated in Figures 1 to 4, inclusive. It also employs the same construction of fluid pressure operated actuator and mechanical actuator and limiting stop, as illustrated in Figures 1 to 4, inclusive. The resilient dished spoke disc 57 is operatively connected at its hub to the axially reciprocable sleeve 58 through the transversely split mounting collar 59 located in an annular groove in the sleeve. However, the sleeve is provided with the rearwardly extending diametrically opposite arms 60 at the free ends of which are located the integral return-bent projections or hooks 61. 62 is a generally annular or ring-link lever of generally U-shaped cross section of a diameter such that the base of the U engages the ends of the projections or hooks 61. The lower end of the lever is formed with the radially downwardly extending depression 63 which is located in the forwardly extending depression 64 formed on the backing plate 65. The depression cooperates with the parts of the backing plate adjacent the sides of the depression to hold the lower end of the lever from both forward and rearward displacement relative to the backing plate. The upper end of the lever 62 is engaged by the lower end of the lever 66 which is pivotally mounted intermediate its ends upon the U-shaped bracket 67 formed in the same manner as the brackets 49 and 52 and also secured to the backing plate in the same manner. The upper end portion of the lever 66 is adapted to be swung forwardly by the same construction of fluid pressure operated actuator 68 and mechanical actuator 69 and the same construction of stop 70 is used, all as illustrated in Figures 1 to 4, inclusive. In this construction it will also be noted that the lever 66 extends radially above the axis of the brake and is located midway of the space between adjacent spokes of the disc.

Figure 11:
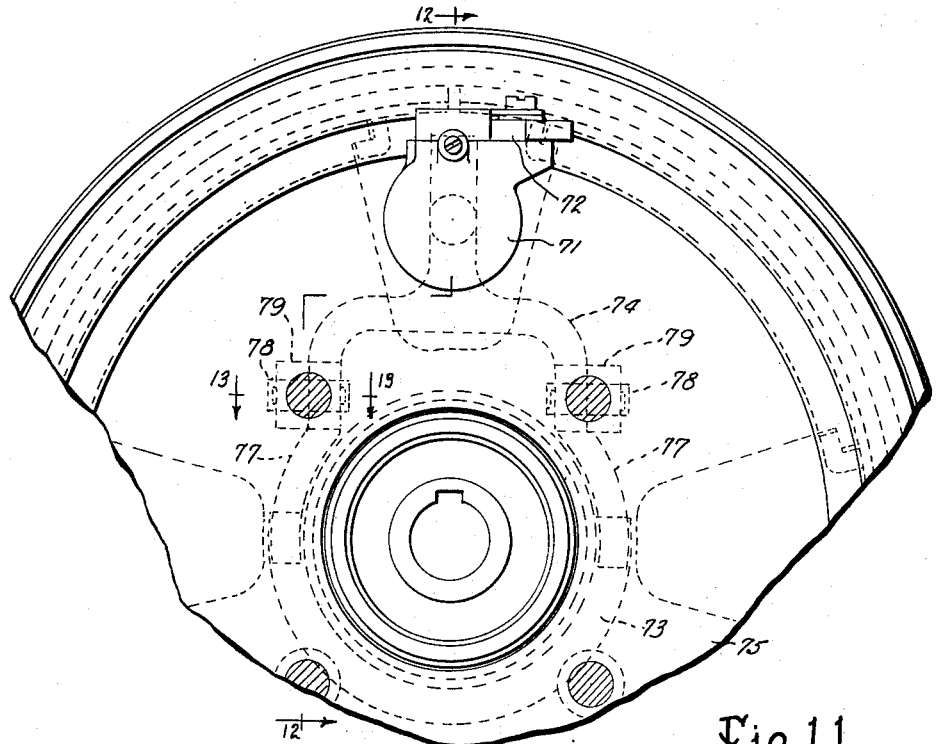
Figures 11 and 12 are views similar to Figures 1 and 2, respectively, showing another modification.
Figure 12:
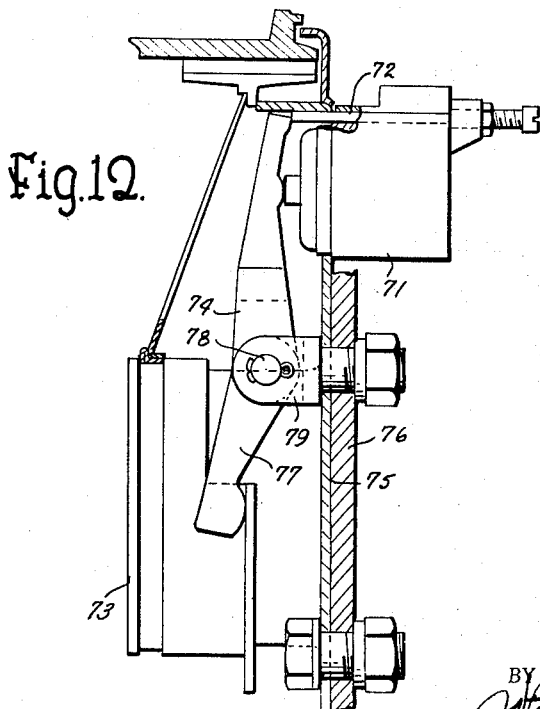
Figure 13:
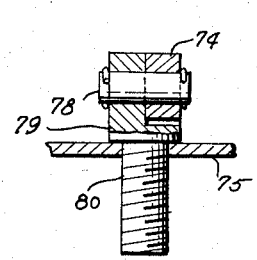
Figure 13 is a cross section on the line 13—13 of Figure 11.

Figures 11, 12 and 13 illustrate another modification of brake having the same construction of relatively movable elements and fluid pressure operated actuator and mechanical actuator and limiting stop, as illustrated in Figures 1 to 4, inclusive. Figures 11, 12 and 13 show another mechanism located between the fluid pressure operated actuator 71 and the mechanical actuator 72 and the sleeve 73 which carries the shoe actuating disc. More in detail, the mechanism comprises the lever 74 which is pivotally carried by the means for securing the backing plate 75 to the flange 76 upon either the axle housing or the steering spindle. The lever has the downwardly diverging furcations 77 each of which is pivotally mounted intermediate its ends upon the pin 78 carried by the head 79 of the securing member 80 used in securing the backing plate to the flange. The lower ends of the furcations are engageable with the semi-circular radial flange at the rear end of the sleeve 73.

What I claim as my invention is:

1. In a friction coupling, the combination of relatively rotatable elements, one of said elements comprising a member having a friction face and the other of said elements comprising a friction member movable into engagement with said friction face, actuating means for said friction member comprising a member the inner portion of which is axially movable and the outer portion of which is radially movable and operatively connected to said friction member, a lever operatively connected to the inner portion of said actuating member, fluid pressure operated means associated with said lever for moving said lever in one direction, and means carried by said fluid pressure operated means for limiting the movement of said lever in the opposite direction.

2. In a friction coupling, the combination of relatively rotatable elements, one of said elements comprising a member having a friction face and the other of said elements comprising a friction member movable into engagement with said friction face, a disc operatively connected to said friction member for moving the same, a lever operatively connected to said disc for actuating the same, fluid pressure operated means mounted independently of and associated with said lever for moving said lever in one direction, and means carried by said fluid pressure operated means and engageable with said lever for limiting the movement of said lever in the opposite direction.

3. In a friction coupling, the combination of relatively rotatable elements, one of said elements comprising a member having a friction face and the other of said elements comprising a friction member movable radially into engagement with said friction face, a disc having an axially movable central portion and a radially movable outer portion operatively connected to said friction member for moving the same, a lever operatively connected to the central portion of said disc for actuating the same, a wheel cylinder mounted independently of said lever for moving said lever in one direction, and adjustable means on said wheel cylinder engageable with said lever for limiting the movement of said lever in the opposite direction.

4. In a friction coupling, the combination of relatively rotatable elements, one of said elements comprising a member having a friction face and the other of said elements comprising a friction member movable into engagement with said friction face, a disc operatively connected to said friction member for moving the same, a lever operatively connected to said disc for actuating the same, a wheel cylinder comprising a cylinder mounted independently of said lever and a piston within said cylinder for moving said lever in one direction, and a member adjustably mounted on said cylinder and engageable with said lever for limiting the movement of said lever in the opposite direction.

5. In a friction coupling, the combination of relatively rotatable elements, one of said elements comprising a member having a friction face and the other of said elements comprising a friction member movable into engagement with said friction face, a disc operatively connected to said friction member for moving the same, a lever operatively connected to said disc for actuating the same, a wheel cylinder comprising a cylinder and a piston within said cylinder for moving said lever in one direction, a member movably mounted on said cylinder for also moving said lever in the same direction, and adjustable means on said cylinder engageable with said member to limit the movement of said lever in the opposite direction.

6. In a friction coupling, the combination of relatively rotatable elements, one of said elements comprising a member having an internal friction face and the other of said elements comprising a friction member movable radially into engagement with said friction face, a resilient dished disc operatively connected to said friction member and adapted when being flattened to engage said friction member with said friction face and when being allowed to resume its normal position to disengage said friction member from said friction face, a pivotal lever operatively connected to the central portion of said disc for actuating the same, a wheel cylinder comprising a cylinder and a piston within said cylinder engageable with said lever to move the same in one direction and a rod reciprocably mounted on said cylinder and engageable with said lever radially outwardly of the zone of engagement of said lever with said piston to move said lever in the same direction, a bell crank pivotally mounted on said cylinder and engageable with said rod, and an adjustable member mounted on said cylinder engageable with said rod to limit swinging thereof in one direction.

7. In a friction coupling, the combination of relatively rotatable elements, one of said elements comprising a member having a friction face and the other of said elements comprising a friction member movable into engagement with said friction face, a disc operatively connected to said friction member for moving the same, a reciprocable member carrying said disc, a lever operatively connected to said reciprocable member for moving the same in one direction, a second lever operatively connected to said first mentioned lever for swinging the same in one direction, and means associated with said second lever for moving said second lever in one direction and for limiting the movement of said second lever in the opposite direction.

8. In a friction coupling, the combination of relatively rotatable elements, one of said elements comprising a member having an internal friction face and the other of said elements comprising a friction member movable radially into engagement with said friction face, a resilient dished disc operatively connected to said friction member and adapted to radially move the same toward and away from said friction face, a sleeve carrying said disc, levers operatively connected to said sleeve in zones substantially diametrically opposite each other for moving the same in one direction, another lever, links connecting said first mentioned levers to said last mentioned lever, and means for actuating said last mentioned lever.

9. In a friction coupling, the combination of relatively rotatable elements, one of said elements comprising a member having an internal friction face and the other of said elements comprising a friction member movable radially into engagement with said friction face, a resilient dished disc operatively connected to said friction member and adapted to move the same radially toward and away from said friction face, a sleeve carrying said disc, a generally ring-shaped lever operatively connected to said sleeve, a second lever having a portion directly engageable with said first mentioned lever for actuating the same, and means for actuating said second lever.

10. In a brake, the combination of relatively rotatable elements frictionally engageable with each other, one of said elements comprising a movable friction member, actuating means for said friction member comprising a member the inner portion of which is axially movable and a lever operatively connected to said inner portion, and means for pivotally supporting said lever comprising a member for fixedly securing the backing plate of the brake in place.

11. In a brake, the combination of a brake drum, a backing plate therefor, bolts for mounting said backing plate, a friction member movable into engagement with said brake drum, a disc operatively connected to said friction member for moving the same, a lever having furcations operatively connected to said disc for actuating the same, and means upon said backing plate mounting bolts for pivotally mounting said furcations.

PHELPS M. FREER.